3,074,942
α-SUBSTITUTED GLYCINE DERIVATIVES
Albert Joseph Hermann Jöhl and Willy Stoll, Basel, Switzerland, assignors to Geigy Chemical Corporation, Ardsley, N.Y., a corporation of Delaware
No Drawing. Filed Feb. 17, 1960, Ser. No. 9,175
Claims priority, application Switzerland Jan. 13, 1958
10 Claims. (Cl. 260—247.2)

The present application is a continuation-in-part of application Serial No. 784,459, filed January 2, 1959 (and abandoned since the filing of the present application).

The present invention concerns a new process for the production of new α-substituted glycine derivatives of the formula

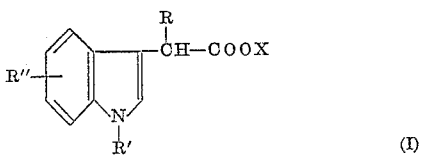

wherein:

R represents a member selected from the group consisting of lower monoalkylamino, lower dialkylamino, benzylamino, lower alkylbenzylamino, pyrrolidino, piperidino, and morpholino radicals, R' represents a member selected from the group consisting of hydrogen, methyl and benzyl, R" represents a member selected from the group consisting of hydrogen, chlorine, lower alkoxy and benzyloxy, X represents a member selected from the group consisting of hydrogen, lower alkyl and benzyl.

The new compounds can be used, for example, as therapeutics. In particular they have an action on the central nervous system and can be used, for example, for the potentiation of general anaesthesia and as agents having a depressing action on the central nervous system. They are also useful as antagonists to serotonine, acetylcholine and histamine. The new compounds are distinguished by a very low toxicity.

It has surprisingly been found that glyoxylic acid or esters thereof can be condensed with indoles which contain one reactive methine group, in particular with compounds of the formula

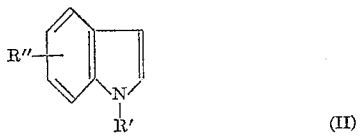

wherein R' and R" have the meanings defined above, and with a primary or secondary amine, in a medium having a neutral to alkaline reaction to form glycine derivatives which are mono-substituted in the α-position as well as mono- or di-substituted in the amino group. The reaction according to the present invention is advantageously performed at temperatures between 60 and 80° and in media having a pH from 7 to 11, advantageously between 8 and 10. The glyoxylic acid and the compound of Formula II are used with advantage in equimolecular ratio, but an excess of amine, for example twice to three times the equimolecular amount, is used. This excess can, at the same time, serve to maintain an alkaline reaction until the condensation is complete. However, also the equimolecular amount of caustic soda lye or potassium lye can be used for this purpose instead of excess amine. Water is used with advantage as solvent or diluent, to which, if desired, can be added, for the improvement of the water solubility of the reaction components, organic solvents which are miscible with water, such as methanol, ethanol, isopropanol or dioxan. The same effect is also obtained in some cases with an excess of the amine used for the reaction, provided the amine itself has sufficient water solubility. Under the reaction conditions, the ester group of the glyoxylic acid ester is often hydrolysed. In these cases the use of glyoxylic acid esters, for example of the benzyl or low molecular alkyl esters, instead of the free glyoxylic acid can also be of advantage, however, as the esters are more easily obtained in a pure state than the acid, and sometimes better yields are obtained. Advantageously the ester and, thus, also the amine are used, for example in about a 10% excess.

The reaction can also be performed in the absence of solvents or diluents. In this case, external heating is sometimes unnecessary as, at the beginning, the reaction is exothermic it can simply be left at room temperature. The reaction can also be performed in dimethyl-formamide or acetonitrile as solvents at a temperature of 0–5° and, if necessary, by finally heating for several hours at a temperature of 30–80°. In the last two cases, the esters of amino acids are obtained.

A particular object of the invention is a process for the production of compounds of Formula I which comprises reacting by intimately mixing the following three components:

(a) A compound selected from the group consisting of glyoxylic acid, lower alkyl glyoxylate and benzyl glyoxylate, (b) A compound selected from the group consisting of lower mono-alkylamine, lower dialkylamine, monobenzylamine, lower alkylbenzylamine, pyrrolidine, piperidine and morpholine, and (c) A compound selected from the group consisting of indole, 1-methyl indole, 5-chlorindole, 5-benzyloxyindole, at a temperature between 0° and 80° C.

The following examples further illustrate the performance of the new process. Parts are given as parts by weight and their relationship to parts by volume is as that of grams to cubic centimetres. The temperatures are in degrees centigrade.

*Example 1*

5.0 parts of dimethylamine are added dropwise while cooling well with ice to 11.2 parts of glyoxylic acid ethyl ester. 11.7 parts of finely pulverised indole are then added in portions and the mixture is left to stand at room temperature for 24–48 hours. The indole gradually dissolves and the viscous mass turns red.

The reaction mixture is taken up in ether and a small amount of an insoluble oily secondary product is removed. The basic reaction product is then extracted with 2 N-hydrochloric acid while cooling with ice. The hydrochloric acid solution is then made alkaline with 2 N-caustic soda lye immediately while cooling well, whereupon the base separates in the form of an oil. It is dissolved in ether, the ethereal solution is washed well with water and dried over sodium sulphate. After distilling off the solvent, the α-N.N-dimethylamino-indole-3-acetic acid ethyl ester is recrystallised from ether/petroleum ether. M.P. 98–100°.

The following compounds can be produced in an analogous manner:

α-N.N-diethylamino-indole-3-acetic acid ethyl ester, M.P. 97–100° (from ethyl acetate), α-Morpholino-indole-3-acetic acid ethyl ester, M.P. 76–78° (from ether/petroleum ether/cyclohexane), α-Piperidino-indole-3-acetic acid ethyl ester, M.P. 88–89° (from ether/petroleum ether), α-N-n-butylamino-indole-3-acetic acid ethyl ester, M.P. 61–62° (from petroleum ether), α-N-benzylamino-indole-3-acetic acid ethyl ester, M.P. 89–90° (from ether/petroleum ether).

*Example 2*

9.5 parts of morpholine are added dropwise at 0–4° to a solution of 11.2 parts of glyoxylic acid ethyl ester in 30 parts by volume of dimethyl formamide and on completion of the addition the whole is stirred for 1 hour at the same temperature. 11.7 parts of indole in small portions are then added at 0–4°. After the reaction mixture has attained room temperature it is stirred for 2 hours at this temperature and finally it is heated for 3–7 hours at 30–80°.

The product is worked up as follows: The dimethyl formamide is distilled off in the vacuum in a nitrogen atmosphere and the residue is dissolved in ether, slight amounts of a product insoluble in ether being thrown away. The ethereal solution is extracted under ice cooling with 2 N-hydrochloric acid or with 2 N-tartaric acid and the extracts are each immediately made alkaline while cooling well with 2 N-caustic soda lye. The oily base which separates is extracted with ether, the ethereal solution is washed with water and dried over sodium sulphate. After distilling off the solvent, the residue is crystallised from ether/petroleum ether/cyclohexane. The α-morpholino-indole-3-acetic acid ethyl ester obtained melts at 76–78°.

The compounds named in Example 1 as well as α-pyrrolidino-indole-3-acetic acid ethyl ester (M.P. 90–91° from ether/petroleum ether) can also be obtained in an analogous manner.

The dimethyl formamide can be replaced by acetonitrile, tetrahydrofuran, dimethylsulphoxide or ethyl ether, but in this case the yields are smaller. Instead of glyoxylic acid ethyl ester, glyoxylic acid benzyl ester may also be used in the manner described in the above example, whereby e.g. α-pyrrolidino-indole-3-acetic acid benzylester (M.P. 100–101°; from ether/ethyl acetate/petroleum ether) is obtained.

The reaction described in the above example can also be performed using boron trifluoride (e.g. in the form of the etherate $BF_3 \cdot (C_2H_5)_2 O$) as catalyst, preferably in the amount of one tenth of a molar part. Thus, for example, α-morpholino-5-chlorindole-3-acetic acid ethyl ester (M.P. 109–111°) is obtained in a better yield if boron trifluoride is used as a catalyst. α-Morpholino-1-benzyl-indole-3-acetic acid ethyl ester (M.P. 84–86°; from ether/petroleum ether) is obtained in an analogous manner.

*Example 3*

23.4 parts of indole, 22.4 parts of glyoxylic acid ethyl ester and 26.6 parts of N-methyl-N-benzylamine in 60 parts by volume of dimethyl formamide are reacted as described in Example 2. The product is worked up by distilling off the dimethyl formamide in the vacuum in a nitrogen atmosphere and the oily residue in 2 N-hydrochloric acid is triturated while cooling with ice (Vibro mixer). After a short time, the hydrochloride separates in crystalline form. It is thoroughly washed with water and then with acetone. Carefully recrystallised from ethanol/ether, the α-N-methyl-N-benzylamino-indole-3-acetic acid ethyl ester hydrochloride melts at 143–144° on decomposition.

The reaction described in this example can also be performed if, instead of dimethyl formamide, tetrahydrofuran, ethyl ether, dimethyl sulphoxide or acetonitrile are used, but the yields obtained are somewhat less in each case.

When starting from 5-benzyloxyindole,
5-chloroindole or
1-methylindole respectively the following compounds are obtained in an analogous manner:

α - N.N-dimethylamino-5-benzyloxy-indole-3-acetic acid ethyl ester, M.P. 143–145° (from ether),
α - N-methyl-N-benzylamino-5-benzyloxy-indole-3-acetic acid ethyl ester, M.P. 114–116° (from ether/ethyl acetate/petroleum ether),
α-Morpholino-5-benzyloxy-indole-3-acetic acid ethyl ester, M.P. 97–99° (from ether/petroleum ether); this compound, when debenzylated yields
α-Morpholino-5-hydroxy-indole-3-acetic acid ethyl ester, M.P. 164–166° (decomposition) (from ethanol/petroleum ether),
α-Pyrrolidino-5-benzyloxy-indole-3-acetic acid ethyl ester, M.P. 169–170° (from chloroform/petroleum ether),
α-Morpholino-5-chlor-indole-3-acetic acid ethyl ester, M.P. 109–111° (from ethyl acetate/petroleum ether),
α-Pyrrolidino-5-chlor-indole-3-acetic acid ethyl ester, M.P. 149–150° (from ethyl acetate/petroleum ether),
α-Morpholino-1-methyl-indole-3-acetic acid ethyl ester, M.P. 57–58° (from ether/petroleum ether).

*Example 4*

A solution of 23.4 parts of benzylamine in 25 parts by volume of acetonitrile are added over a period of 24 hours at 0–3° to a solution of 22.4 parts of glyoxylic acid ethyl ester and 23.4 parts of indole in 60 parts by volume of acetonitrile, which solution has been cooled to 0°. The whole is then stirred further for 24 hours at 0–3°.

The product is worked up as follows: The acetonitrile is distilled off in the vacuum in a nitrogen atmosphere. The oily residue is taken up in ether, an insoluble oil product being thrown away. The base is extracted with 2 N-hydrochloric acid while cooling well with ice and each hydrochloric acid extract is immediately made alkaline with 2 N-caustic soda lye under intensive ice cooling. The base separates as an oil and is taken up in ether. The ethereal solution is washed well with water and dried over sodium sulphate. After removal of the solvent, the residue is crystallised from ether/petroleum ether. The α-N-benzylamino-indole-3-acetic acid ethyl ester obtained melts at 89–90°. It can be saponified to the α-N-benzylamino-indole-3-acetic acid (M.P. 205–207°; decomposition) by means of 2 N-sodium hydroxide in a mixture of acetone and ethanol at room temperature. This compound shows a good tuberculostatic action and low toxicity on mice.

α-N-benzylamino-5'-benzyloxy-indole-3-acetic acid ethyl ester and α-N-n-butylamino-indole-3-acetic acid ethyl ester (M.P. 61–62° from petroleum ether) can be obtained in an analogous manner. When using glyoxylic acid benzyl ester instead of glyoxylic acid ethyl ester, but otherwise working in the manner described in the above example, α-benzylamino-indole-3-acetic acid benzyl ester (M.P. 124–125°; from ethyl acetate/petroleum ether) is obtained.

The above reaction can also be performed using tetrahydrofuran, ethyl ether, dimethyl sulphoxide or dimethyl formamide instead of acetonitrile, but less yields are obtained.

The following compounds may be obtained in the manner described in Example 2:

α-Morpholino-4-methoxy-indole-3-acetic acid ethyl ester,
α-Pyrrolidino-4-benzyloxy-indole-3-acetic acid ethyl ester, and
α-Morpholino-5-methoxy-indole-3-acetic acid ethyl ester.

We claim:

1. α-Pyrrolidino-indole-3-acetic acid benzylester.
2. α-Morpholino-5-chlorindole-3-acetic acid ethyl ester.
3. α-Morpholino-5-benzyloxy-indole-3-acetic acid ethyl ester.

4. α-Morpholino-5-hydroxy-indole-3-acetic acid ethyl ester.

5. α-Pyrrolidino-5-chlor-indole-3-acetic acid ethyl ester.

6. Process for the production of an α-substituted glycine derivative of the formula

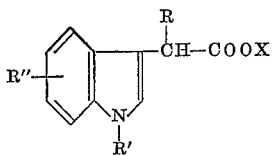

wherein R represents a member selected from the group consisting of lower monoalkylamino, lower dialkylamino, benzylamino, lower alkylbenzylamino, pyrrolidino, piperidino, and morpholino radicals, R' represents a member selected from the group consisting of hydrogen, the methyl and benzyl radical, R'' represents a member selected from the group consisting of hydrogen, chlorine, lower alkoxy and benzyloxy, X represents a member selected from the group consisting of hydrogen, lower alkyl and benzyl, which comprises reacting by intimately mixing the following three components:

(a) a compound selected from the group consisting of glyoxylic acid, lower alkyl glyoxylate and benzyl glyoxylate, (b) a compound selected from the group consisting of lower monoalkylamine, lower dialkylamine, monobenzylamine, lower alkylbenzylamine, pyrrolidine, piperidine and morpholine, and (c) a compound selected from the group consisting of indole, 1-methyl indole, 1-benzylindole, 5-chlorindole, 4-benzyloxyindole, 5-benzyloxyindole, 4-methoxyindole and 5-methoxyindole, at a temperature between 0° and 80° C.

7. Process according to claim 6, which comprises intimately mixing one molar part of component (a) with at least one molar part of component (b) and adding one molar part of component (c) at room temperature.

8. Process according to claim 6, which comprises dissolving one molar part of component (a) in a solvent selected from the group consisting of dimethylformamide, tetrahydrofuran, ethyl ether, dimethylsulphoxide and acetonitrile, adding at least one molar part of component (b) at a temperature between 0° and 5°, then adding one molar part of component (c) at the same temperature and finally heating for several hours at a temperature of at least 30° and at most 80°.

9. Process according to claim 8, which comprises the use of about one tenth of a molar part of boron trifluoride as a reaction catalyst.

10. Process according to claim 6, which comprises dissolving one molar part of component (a) and about one molar part of component (c) in a solvent selected from the group consisting of acetonitrile and a mixture of ethanol and water and adding one molar part of component (b), dissolved in the said solvent, at a temeprature between 0° and +5°.

References Cited in the file of this patent
UNITED STATES PATENTS

| | | |
|---|---|---|
| 2,766,255 | Pfister et al. | Oct. 9, 1956 |
| 2,892,753 | Schmidt et al. | June 30, 1959 |
| 2,948,714 | Amiard et al. | Aug. 9, 1960 |
| 2,971,887 | Johnson | Feb. 14, 1961 |

OTHER REFERENCES

Merck Index, sixth edition, page 981 (1952).